DEDUCTIVE LIGHT PEN TRACKING SYSTEM

Filed Jan. 15, 1968 3 Sheets-Sheet 1

INVENTORS
HERBERT B. BASKIN
LARRY E. RITTENHOUSE
BY John J. Goodwin
ATTORNEY

Dec. 29, 1970 H. B. BASKIN ET AL 3,551,896

DEDUCTIVE LIGHT PEN TRACKING SYSTEM

Filed Jan. 15, 1968 3 Sheets-Sheet 2

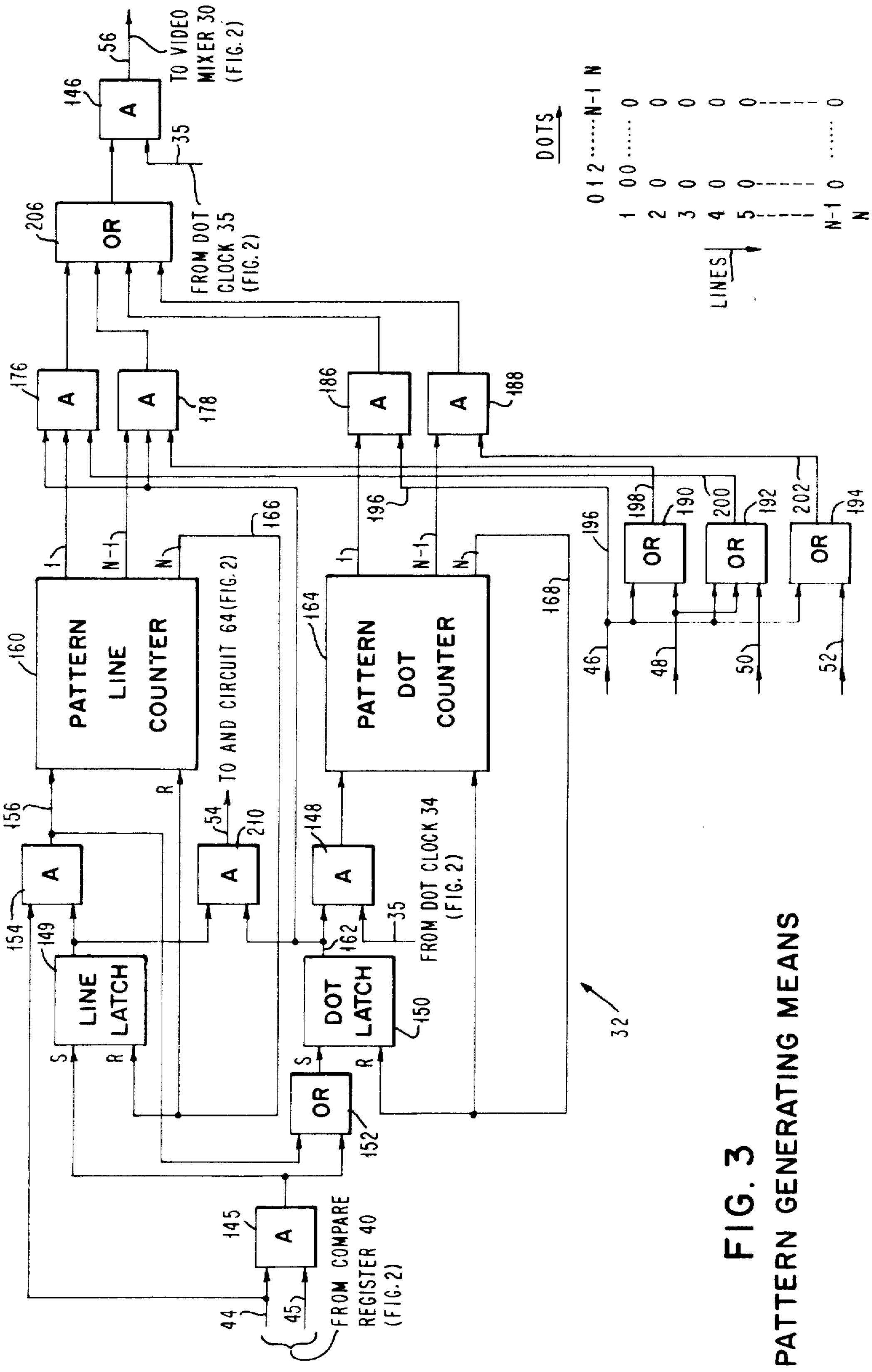
FIG. 3 PATTERN GENERATING MEANS, FIG. 4

United States Patent Office 3,551,896
Patented Dec. 29, 1970

3,551,896
DEDUCTIVE LIGHT PEN TRACKING SYSTEM

Herbert B. Baskin, Mohegan Lake, and Larry E. Rittenhouse, Crompond, N.Y., assignors to International Business Machines Corporation, Armonk, N.Y., a corporation of New York Filed Jan. 15, 1968, Ser. No. 697,869
Int. Cl. G09f 9/38
U.S. Cl. 340—172.5 16 Claims

ABSTRACT OF THE DISCLOSURE

A system for producing a light pen tracking pattern on the screen of a cathode ray tube of the type having a rectilinear raster. The system includes means for initially generating a closed geometric pattern on the cathode ray tube screen. A light pen is initially pointed to the center of the pattern. As the light pen moves, it will encounter and edge of the pattern and initiate means for generating a second display consisting of portions of the first display. The system continues to branch and generate another display to ultimately determine the direction of movement of the light pen.

BACKGROUND OF THE INVENTION

Field of the invention

This invention relates to the control of apparatus and devices at a distance by means of radiant energy and, more particularly, to input devices employing a light pen and a screen.

Description of the prior art

A prior art system wherein the direction of a light pen is determined by using X and Y direction storage registers is disclosed in U.S. Pat. 3,337,860 entitled "Display Tracking System," issued Aug. 22, 1967, to A. C. O'Hara, Jr. and assigned to the present assignee.

Another light pen system is described in the IBM Systems Reference Library publication entitled "IBM System/360 Component Description IBM 2250 Display Unit Model 1," File No. S360-03 Form A27-2701-0.

Still other light pen systems are described in the following references:

U.S. Patent 3,346,853, R. A. Koster et al.
U.S. Patent 3,037,192, R. R. Everett
U.S. Patent 3,089,918, R. E. Graham

SUMMARY OF THE INVENTION

The present invention relates to means for producing a light pen tracking pattern for a cathode ray tube light pen system wherein the display on the cathode ray tube screen is generated by a rectilinear raster. Identifying, with a light pen, an illuminated point on a raster generated cathode ray tube image is commonly accomplished by strobing counters which count raster lines and the dot positions on each raster line. This approach is expensive and requires a fast strobe pulse from the light pen at the instant the electron beam of the cathode ray tube illuminates the point on the screen under the pen.

An object of the present invention is to provide a light pen tracking pattern system which determines the direction of movement of a light pen by three deductive display steps and which requires only one pen response during each frame of the display.

The foregoing and other objects, features and advantages of the invention will be apparent from the following more particular description of a preferred embodiment of the invention, as illustrated in the accompanying drawings.

BRIEF DESCRIPTION OF THE DRAWINGS

In the drawings:

FIG. 3 is a detailed schematic of the pattern generating hardware used in the embodiment shown in FIG. 2; and FIG. 4 is an illustration of a pattern format showing the dimensions and shape of the tracking pattern.

DESCRIPTION OF THE PREFERRED EMBODIMENT

Light pen devices are used to enter information, particularly graphical information, into a computing system. Light pen systems include a screen, such as a cathode ray tube screen, for displaying information and a hand held light pen which is light sensitive within a narrow field of view. The operator points the light pen at the screen and the light pen produces an output when its field of view is directed to lines of the display. As the light pen moves over the screen, the cathode ray tube is able to display the trace of the pen movement so as to generate a configuration on the surface of the screen. The position of the light pen as it moves over the screen can be detected and stored and the positional information can be converted to digital information for entry into a computing system.

A necessary component of light pen systems is a tracking pattern which is displayed on the screen. When the operator wishes to write a configuration on the screen, he must first direct the light pen onto the center of the tracking pattern before he starts to move the pen across the screen. This disclosure describes a light pen tracking system for use with a graphic system which generates an image on a cathode ray tube screen by illuminating points in a repetitively scanned rectilinear raster. A tracking pattern is displayed on a portion of the screen in the form of a square or rectangle or similar enclosed figure. The light pen is initially pointed at the center of the square and as the pen is moved, one of the four sides of the pattern will pass within its field of view depending on the direction it is moving. When the pen detects one of the sides of the pattern, a signal is generated indicating that the pen is moving. However, because a raster pattern is being employed, it cannot be initially determined in which direction the light pen is moving, that is, the signal does not indicate which of the four sides of the pattern has been detected by the light beam. Therefore, in the present system further patterns are subsequently generated.

Figure 1:
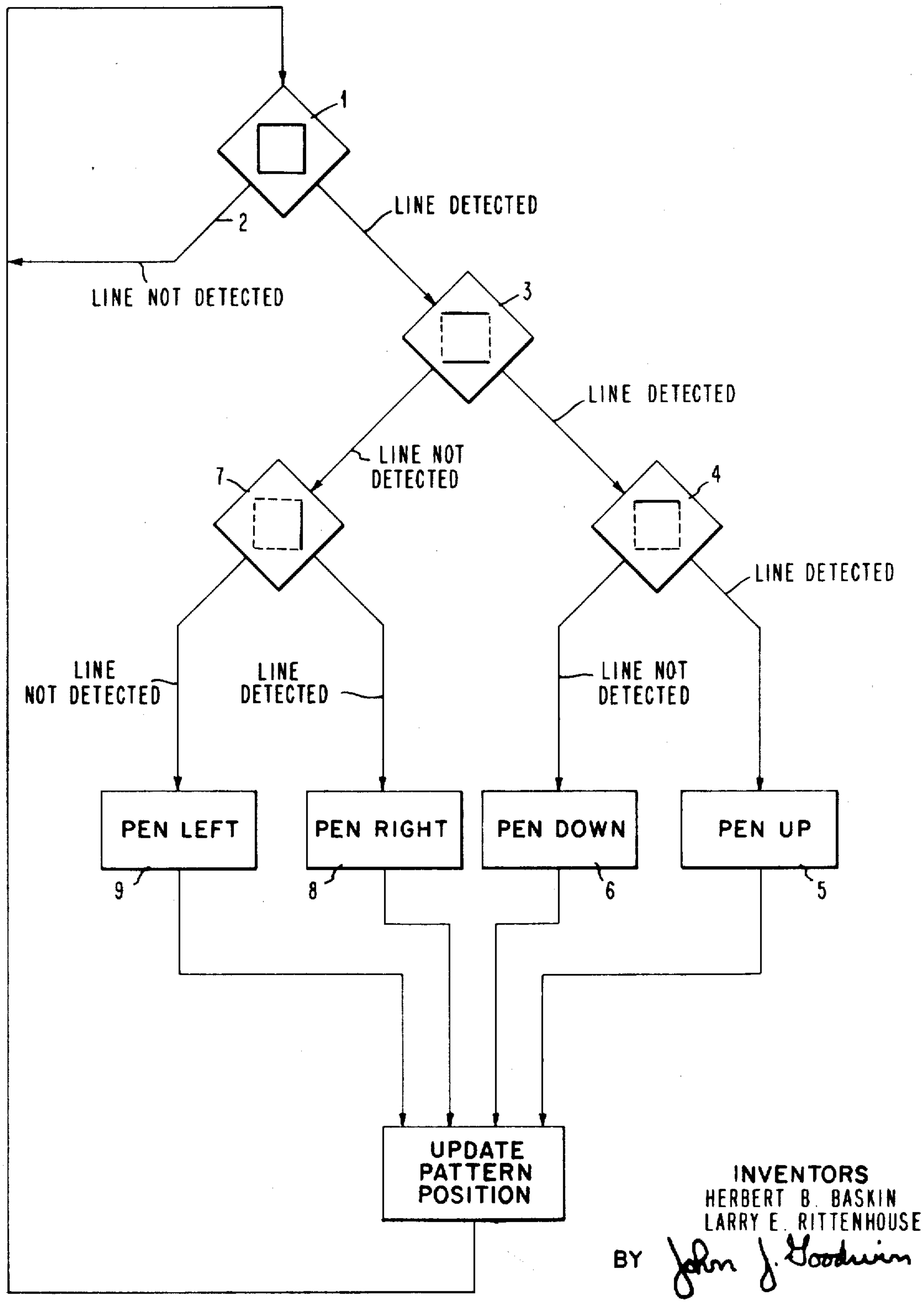
FIG. 1 is a functional flow diagram describing the deductive steps performed by the system.

Referring to FIG. 1, a logical flow diagram of the functions performed by the system of the present invention is provided. In the first step of the sequence, an entire four-sided tracking pattern is displayed as represented in block 1. The light pen is directed to the center of this pattern. As the light pen moves, it will detect one of the four lines constituting the sides of the pattern. When the light pen detects a line, a signal is provided. Feedback loop 2 insures that the entire pattern is displayed until the light pen detects one of the four sides. When the light pen detects one of the four sides, a line detected condition occurs and the pattern is modified so that only the top and bottom sides are displayed as shown in block 3. The portion of the original pattern which is not displayed is shown by dotted lines. If a line is again detected, this indicates that the pen must be moving either up or down. In such case, the pattern is modified so that just the top side of the pattern is displayed as shown in block 4. If a line is again detected, this indicates that the pen is moving up and this information is provided by block 5. On the other hand, if a line was not detected, this indicates that the pen is moving down and this information is supplied by block 6. In block 3, if a line was not detected, this indicates that the pen was moving either left or right. In such event, the pattern is modified such that just the right side of the pattern is displayed as shown in block 7. If a line is detected, it indicates that the light pen is moving to the right and this information is provided by block 8. If no line is detected, it indicates that the pen is moving toward the left and this information is provided in block 9. The information from blocks 5, 6, 8 and 9 indicate the direction that the pen is moving. This information is provided to block 10 which updates the pattern position by repositioning the entire pattern a given increment in the direction of the pen movement and the sequence is repeated.

Figure 2:
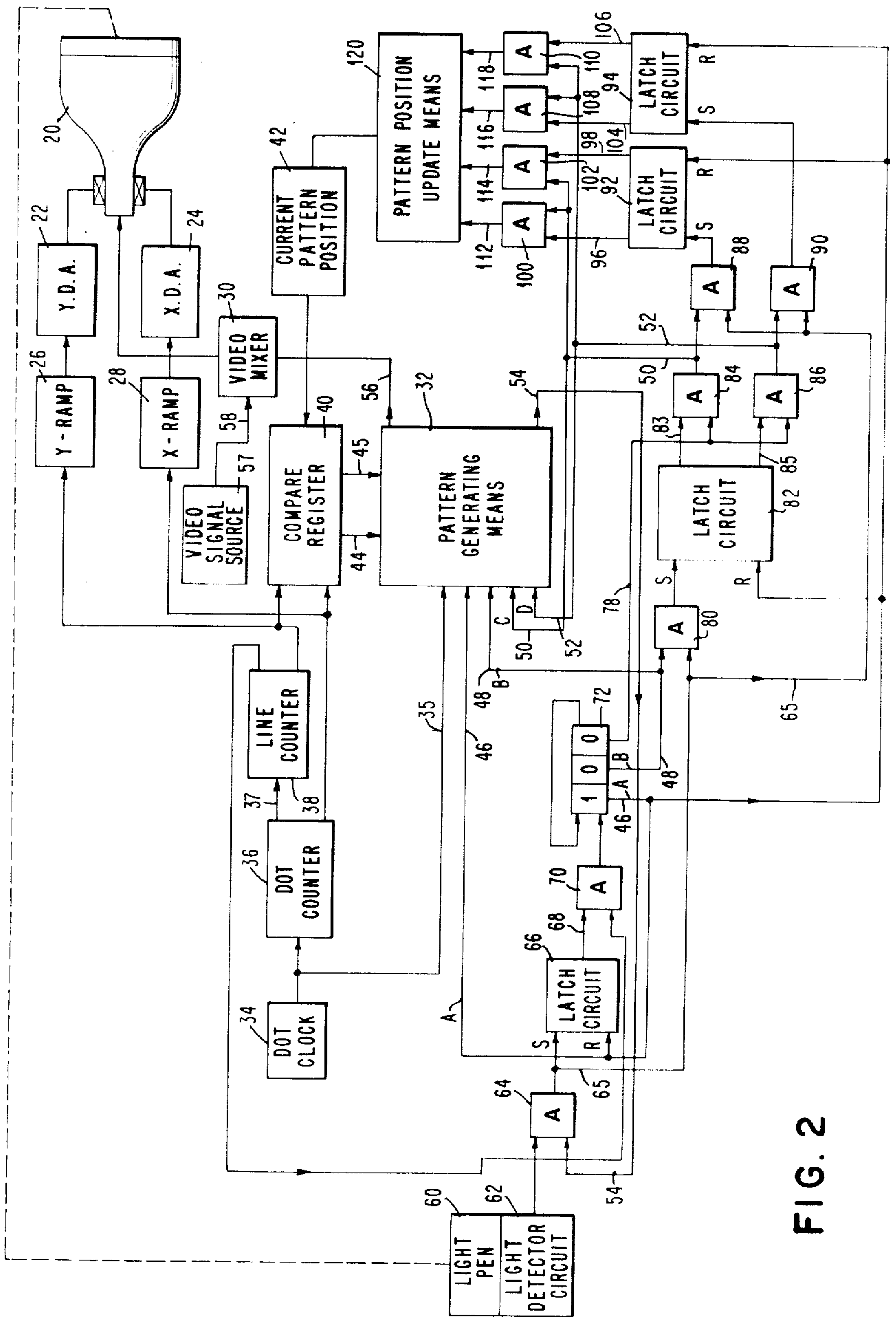
FIG. 2 is a schematic block diagram of a preferred embodiment of the present invention.

Referring now to FIG. 2, a block diagram of the system embodiment for carrying out the tracking method of FIG. 1 is shown. In FIG. 2, a conventional cathode ray tube 20 is provided which displays the tracking pattern and video information by means of a rectilinear raster scan. The cathode ray tube 20 includes a deflection yoke for deflecting the electron beam and the deflection yoke is controlled by Y deflection amplifier 22 and X deflection amplifier 24 which, in turn, receive input signals from the Y ramp generator 26 and the X ramp generator 28 respectively. The information to be displayed on the cathode ray tube is provided by video signal source 57 and applied on lead 58 through a video mixer 30 to the control grid to control the intensity of the signal on the screen of the cathode ray tube. Video signal source 57 is representative of any video input signal device to the display and may include a data processor. The tracking pattern discussed heretofore is also applied to the cathode ray tube via lead 56 and video mixer 30. The tracking pattern is generated by pattern generating means 32 which will be described in greater detail with respect to FIG. 3. The system of FIG. 2 also includes a dot clock 34 which is the basic timing clock for the entire system. The dot clock 34 is actually an oscillator which generates pulses which are applied on lead 35 to pattern generating means 32 so that ultimately dots will be selectively displayed across the face of the cathode ray tube. The pulses from dot clock 34 are also applied to a dot counter 36. Dot counter 36 counts up to the number of dots which constitutes one line of the raster and then resets. When dot counter 36 resets, a a pulse is applied on reset lead 37 to a line counter 38 which increments once for each line of the raster. The output from dot counter 36 is applied to the X ramp generator 28. The output from line counter 38 is applied to Y ramp generator 26. Thus, dot counter 36 and line counter 38 generate the rectilinear raster on the cathode ray tube via the Y and X ramp generators 26 and 28 and Y and X deflection amplifiers 22 and 24, which are connected to the yoke on the cathode ray tube 20 which, in turn, deflects the electron beam of the cathode ray tube over the screen in a rectilinear raster. Thus, the dot counter 36 and the line counter 38 at any given time contain the position information of the electron beam, that is, which dot of which line the electron beam of the cathode ray tube tube is being directed. The output of dot counter 36 and line counter 38 are connected to a compare register 40. Also connected to compare register 40 is current pattern position means 42 which provides signals indicating the position of the tracking pattern on the face of the cathode ray tube in terms of specific lines and dots. Thus, compare register 40 provides a comparison between the position of the electron beam in the cathode ray tube with respect to the tracking pattern. When the current pattern position compares with the beam position as indicated by compare register 40, initiate pattern pulses (that is, an X compare signal and a Y compare signal) are applied to the pattern generating means 32 from the compare register 40 on leads 44 and 45 respectively.

The pattern generating means 32 generates the tracking pattern. In addition to the initiate pattern pulses from the compare register 40, the pattern generating means 32 includes four other control inputs and has two outputs. The four inputs designated A, B, C and D on leads 46, 48, 50 and 52 respectively determine whether the entire four sides of the tracking pattern or a part thereof will be displayed on the face of the cathode ray tube 20 at the current pattern position. Only one of the four control input signals A, B, C or D will be present at any given time. When an A input signal is present on lead 46, the entire tracking pattern, as shown in block 1 of FIG. 1, will be displayed at the current pattern position. When a B input signal is present on lead 48, the top and bottom of the tracking pattern is displayed as illustrated in block 3 of FIG. 1. When a C input signal is present on lead 50, only the top side of the tracking pattern is displayed as illustrated in block 4 of FIG. 1. A D input signal on lead 52 causes only the right side of the tracking pattern to be displayed as is illustrated in block 7 of FIG. 1. As previously stated, signals on lead 44 and 45 from compare register 40 initiates the generation of the tracking pattern. The outputs of the pattern generating means consist of a pattern aperture pulse signal on lead 54, which is present only when the tracking pattern is being displayed on the cathode ray tube 20, that is, the pattern aperture pulse is present only during the section of the raster lines that are associated with the tracking pattern being generated. The pattern aperture pulse is employed to permit the light pen to ignore lines which are not associated with the pattern and therefore prevents the unnecessary initiation of the deductive pattern sequence. The other output from the pattern generating means 32 is the pattern video signal on lead 56. The pattern video signal on lead 56 is generated at the proper time to display the tracking pattern on the cathode ray tube 20. The pattern video signal is mixed with the normal video signal at the video mixer 30. The mixing or summing of the pattern video signal and the normal video signal results in the normal video signal being displayed on the cathode ray tube 20 along with the tracking pattern.

The light pen employed in the system is represented by block 60. A light pen is a conventional device and is simply a light detector which detects light from the activated phosphor on a cathode ray tube when the electron beam of the tube is directed on the phosphor and is illuminating it. Light detect means 62 is the circuit associated with the light pen. Light detect means 62 produces an electrical output pulse when the light pen detects illumination on the cathode ray tube. The output pulse from light detect means 62 is connected to an AND circuit 64. The other input to AND circuit 64 is the pattern aperture pulse on lead 54. The output signal from AND circuit 64 on lead 65 is referred to as the light pen pattern detector pulse. This pulse will only occur when the light pen has detected a line of the tracking pattern. The term tracking pattern "line" refers to the sides of the pattern formed by a series of illuminated dots on the cathode ray tube screen. The light pen pattern detector pulse from AND circuit 64 on lead 65 is connected to and will set latch circuit 66. The setting of latch circuit 66 indicates that the light pen 60 has detected a line of the tracking pattern.

The setting of latch circuit 66 initiates the deductive light pen tracking sequence because an output pulse is now present on output lead 68 from latch circuit 66. The signal on lead 68 is connected to AND circuit 70. The other input to AND circuit 70 is the frame retrace pulse from the line counter which is the pulse which occurs at the end of each frame of video information. Thus, after the tracking pattern has been detected and latch circuit 66 has been set, the frame retrace pulse will be ANDed with the pulse from latch circuit 66 and produce an output signal from AND circuit 70 which is connected to ring counter 72 causing the ring counter 72 which is normally in its initial reset state to step one position to the right which produces the B signal on lead 48. In its previous state, which is shown in FIG. 3, ring counter 72 provided an A signal on output lead 46 which was connected to pattern generating means 32 to cause the entire four sides of the tracking pattern to be generated. However, the stepping of ring counter 72 caused the A signal on lead 46 to cease and provides the B signal on lead 48 which is connected to pattern generating means 32 causing the top line and bottom line of the tracking pattern to be displayed on the cathode ray tube 20. The B signal on lead 48 is also connected to AND circuit 80. The other input to AND circuit 80 is connected to the output lead 65 of AND circuit 64. As previously stated, there will be a light pen pattern detect signal from AND circuit 64 if the light pen 60 is detecting a line of the tracking pattern. Thus, AND circuit 80 will be enabled if the light pen is detecting either the top or bottom line of the tracking pattern. An output signal from AND circuit 80 is connected to and will set the latch circuit 82. If the light pen is not detecting the top or bottom line of the tracking pattern, there will be not output from AND circuit 64 and, consequently, no output from AND circuit 80 and latch circuit 82 will not be set and will remain in the reset condition.

Regardless of whether latch circuit 82 is in the set or reset position, at the end of the next frame of video information, the frame retrace pulse applied to AND circuit 70 causes an output signal from AND circuit 70 to step ring counter 72 to the next position to the right. This causes the B signal on lead 48 to cease and causes an output signal to be present on lead 78. Lead 78 is connected to AND circuit 84 along with the set lead 83 from latch 82 and lead 78 is also connected to AND circuit 86 along with the reset lead 85 from latch circuit 82. If latch circuit 82 is in the set condition, AND circuit 84 is enabled producing a C pulse on lead 50 which is connected to the input of pattern generating means 32 causing only the top line of the tracking pattern to be displayed as illustrated in box 4 of FIG. 1. If, however, latch circuit 82 is in the reset condition, AND circuit 86 is enabled producing a D signal on lead 52 which is connected to pattern generating means 32 causing the right line of the tracking pattern to be displayed as illustrated in box 7 of FIG. 1. The output of AND circuit 84 is also connected to AND circuit 88 along with the light pen pattern detect signal on lead 65. The output from AND circuit 86 is connected to AND circuit 90 along with the light pen pattern detect signal on lead 65. The output from AND circuit 88 is connected to the set lines of latch circuit 92 and a signal therefrom will set latch circuit 92. The output from AND circuit 90 is connected to the set line of latch circuit 94 so that an output from AND circuit 90 will set latch circuit 94.

Latch circuit 92 has a set output lead 96 and a reset output lead 98. Set output lead 96 is connected along with the output of AND circuit 84 to AND circuit 100. The reset output lead 98 is connected along with the output of AND circuit 84 to AND circuit 102. Latch circuit 94 has a set output lead 104 and a reset output lead 106. The set output lead 104 is connected along with the output of AND circuit 86 to AND circuit 108 and the reset output lead 106 is connected to AND circuit 110 along with the output lead from AND circuit 86. The following four separate and distinct cases or possibilities may now occur. In the first case, if AND circuit 84 is enabled producing the C signal on lead 50, the top line of the tracking pattern is displayed. If the light pen is detecting this line, a light pen pattern detect signal is produced on lead 65 which enables AND circuit 88, producing an output signal which sets latch circuit 92 thereby applying a signal on lead 96 to AND circuit 100 along with the C signal on lead 50. This enables AND circuit 100 and produces a $+\Delta Y$ output signal on lead 112. This $+\Delta Y$ output signal indicates that the light pen is moving up.

The second case is that AND circuit 84 is enabled thereby producing a C signal on lead 50 and causing the top line of the tracking pattern to be displayed as illustrated in block 4 of FIG. 1. In this instance, however, the light pen does not detect a line and there is no light pen pattern detect signal on lead 65. Therefore, AND circuit 88 is not enabled and latch circuit 92 remains in its reset condition. Thus, a signal will be present on reset output lead 98 which is applied to AND circuit 102 along with the C signal on lead 50. AND circuit 102 is enabled and provdies a $-\Delta Y$ output signal on lead 114. This indicates that the light pen is traveling down.

The third case is that AND circuit 86 is enabled rather than AND circuit 84. This produces a D signal on lead 52 which causes the right side of the tracking pattern to be displayed on the cathode ray tube 20. If the light pen detects this line, there will be a light pen pattern detect signal on lead 65, which when applied to AND circuit 90 along with the output of AND circuit 86 will enable AND circuit 90 and place latch 94 in the set condition. This provides a signal on set output lead 104 which is applied to AND gate 108 along with the D signal on lead 52. AND circuit 108 is enabled and a $+\Delta X$ output signal appears on lead 116. This indicates that the light pen is moving to the right.

The fourth possibility is that with the right line of the pattern being displayed as in the third case, the light pen did not detect the line. Therefore, there will be no light pen pattern detect signal on lead 65 and, consequently, AND circuit 90 will not be enabled. Latch circuit 94 therefore remains in its reset condition and a signal is present on reset output lead 106. This signal is applied to AND circuit 110 along with the D signal on lead 52 thereby enabling AND circuit 110 and producing a $-\Delta X$ output signal on lead 118. This signal indicates that the light pen is moving to the left.

The signals on leads 112, 114, 116 and 118 indicate that the light pen is moving up, down, to the right, or to the left, respectively, and that the tracking pattern must be moved in the same direction as the light pen. The position of the tracking pattern on the screen is referenced with relation to the dot comprising the upper left-hand corner of the pattern. Thus, the location of the tracking pattern is established by the dot which constitutes the upper left-hand portion of the tracking pattern being M dots in from the left of the raster and N lines down from the top of the raster. For example, a tracking pattern may be located such that the dot comprising the upper left-hand corner of the pattern is 25 dots in from the left of the raster screen and 110 lines down from the top of the raster screen. This is the information which is stored and which is provided by the current pattern position means 42. When a $+\Delta Y$ signal on line 112 is applied to pattern position update means 120, it indicates that the upper left-hand corner of the tracking pattern and, consequently, the entire tracking pattern should be moved up a given distance which may be selected as one or more lines depending on the resolution of the display and the desired tracking speed of the pattern. If a $-\Delta Y$ signal appears on line 114, it means that the tracking pattern should be moved down a given increment (i.e., one or more lines). If a $+\Delta X$ signal appears on lead 116, it means that the tracknig pattern should be moved a given increment to the right (i.e., one or more dots) and if a $-\Delta X$ signal appears on lead 118, it means that the tracking pattern should be moved a given increment to the left.

The current pattern position means 42 is basically a position storage register for retaining the X and Y coordinates of the pattern position and the pattern position update means 120 is a means for incrementing or decrementing either the X or Y coordinates in the current pattern position means 42 in response to the pen movement signals on leads 112, 114, 116 and 118 respectively. Current pattern position means 42 and pattern position update means 120 include conventional registers and incrementing-decrementing circuits and the details of these means being known to one skilled in the art will not be described in detail.

In FIG. 3, a more detailed schematic of the pattern generating means 32 is illustrated. Pattern generating means 32 generates the video signals necessary to produce the tracking pattern displayed on the face of the cathode ray tube 20. The video data signal for the tracking pattern is mixed with the video data signal from source 57 on lead 58 of FIG. 2 that is being transmitted to the cathode ray tube 20 so that the video data and the tracking pattern are displayed on the face of the cathode ray tube 20 simultaneously. The input signals for the pattern generating means in FIG. 3 consists of the A, B, C and D signals on leads 46, 48, 50 and 52 respectively which determine the sides of the tracking pattern that are to be displayed. The other input signals are the X and Y compare signals on leads 44 and 45 respectively from compare register 40 of FIG. 2 and the dot clock signals from dot counter 36 of FIG. 2 on lead 35 which is applied to AND circuits 146 and 148 of pattern generating means 32.

The output signals of the pattern generating means 32 consist of the video dot stream on lead 56 for the tracking pattern which will be mixed with the video signal to generate the pattern on the cathode ray tube, and a pattern aperture pulse on lead 54 which is present only during the time that the tracking pattern is being generated.

The pattern generating means 32 is initiated by the occurrence of both the X compare pulse on lead 44 and the Y compare pulse on lead 45. A pulse appears on the X compare lead 44 when the X position of the electron beam of the cathode ray tube is identical to the X position at which the upper left corner of the tracking pattern is to be displayed and a pulse appears on the Y compare lead when the Y position of the electron beam of the cathode ray tube is identical to the Y position at which the upper left corner of the tracking pattern is to be displayed. Hence, there will be one Y compare pulse per frame of video information and one X compare pulse during each line in the frame of video information. Once during each frame an X compare pulse and a Y compare pulse will occur simultaneously and will initiate the operation of the pattern generating means so that a pattern will be generated at the proper position on the cathode ray tube screen. Simultaneous occurrence of the X compare pulse and the Y compare pulse on leads 44 and 45 enables AND circuit 145 which produces an output signal which sets line latch circuit 148 and sets dot latch circuit 150 via OR circuit 152. Setting the line latch circuit 148 provides a set output signal to AND circuit 154 which is enabled by the X compare pulse on lead 44 and provides an output signal on lead 156 to pattern line counter 160.

Pattern line counter 160 is a counter which counts from zero (0) to $n$ and the signal on lead 158 steps line counter 160 from the zero (0) or reset position to the first or 1 position. Pattern line counter 160, therefore, counts the X compare pulses which are received from the compare register on lead 44 and controls the height of the tracking pattern on the cathode ray tube screen where the height is measured vertically in the number of lines or number of dots that are on the left or right side of the tracking pattern.

Referring to FIG. 4, a pattern format is illustrated which shows the dimensions and shape of a typical tracking pattern which will be displayed on the cathode ray tube screen. The pattern width is measured in dot positions or dots and is $n-1$ dots wide and the pattern height is measured in lines and the height is $n-1$ lines. In many systems utilizing a cathode ray tube and a rectilinear raster for the display of information, the dot-to-dot spacing is identical with the line-to-line spacing. Hence, the $n-1$ by $n-1$ tracking pattern will form a square and will be equal in width and height to exactly $n-1$ times the dot-to-dot or line-to-line spacing for a given display system.

Referring again to FIG. 3, the output from AND circuit 145 is also connected through OR circuit 152 to a dot latch circuit 150 thereby setting dot latch circuit 150 and putting a set output signal on lead 162 which enables AND circuit 148 and thus the dot clock pulses on lead 35 are gated into a pattern dot counter 164. Pattern dot counter 164 counts from 0 to $n$ in response to the dot clock pulses and thereby determines the width of the tracking pattern on the cathode ray tube screen in dots. When both the pattern line counter 160 and the pattern dot counter 164 reach a count of $n$, a reset pulse will be generated. The pattern line counter reset pulse on lead 166 resets the pattern line counter 160 and the line latch 148. The pattern dot counter reset signal on lead 168 resets the pattern dot counter 164 and the dot latch 150.

As previously stated, the pattern line counter 160 counts from 0 to $n$ in response to the X compare pulses. The 1 and the $n-1$ counter positions are connected to AND circuits 176 and 178 respectively and the $n$ counter position provides a reset signal on lead 166. The pattern dot counter counts from 0 to $n$ in response to dot clock signals applied on lead 35. The 1 position and the $n-1$ position of the pattern dot counter are connected to AND circuits 186 and 188 respectively and the $n$ position provides a reset signal on lead 168.

It was previously stated that the sides of the tracking pattern to be displayed are controlled by the presence of the A, B, C, or D pulses on leads 46, 48, 50 and 52. The A lead 46 is connected to OR circuits 190, 192 and 194 and also to lead 196. The B signal lead 48 is connected to OR circuits 190 and 192. The C signal lead 50 is connected to OR circuit 192 and the D signal lead 52 is connected to OR circuit 194. The output of OR circuit 190 on lead 198 is connected to AND circuit 178. The output lead 200 from OR circuit 192 is connceted to AND circuit 176. The output 202 lead from OR circuit 194 is connected to AND circuit 188 and the lead 196 is connected to AND circuit 186. AND circuit 176 is employed in producing the top line of the display. AND circuit 178 is used in producing the bottom line of the display. AND circuit 186 is used in producing the left line of the display and AND circuit 188 is used in producing the right line of the display. AND circuits 176 and 178 are also connected to the set output lead of dot latch circuit 150.

Presume that the four sides of the pattern are to be displayed. This means that the A signal is present on lead 46 and there will be outputs on leads 198, 200, 202 and 196. Thus, AND circuits 176, 178, 186 and 188 will be enabled. AND circuit 176, being connected to the 1 position output line of the pattern line counter, will be enabled for the duration of the top line of the pattern. The output signal from AND circuit 176 is connected through OR circuit 206 and enables AND circuit 146. The other input to AND circuit 146 being the dot clock signal on lead 35, a series of dot pulses appear on line 56 for the period of time that pattern line counter 160 is in the 1 position. The dot signals on lead 56 are connected through video mixer 30 (FIG. 2) to generate the top line of the tracking pattern on the cathode ray tube screen.

AND circuit 186 is connected to the 1 position output of pattern dot counter 164. Thus, AND circuit 186 will be enabled during the first dot position of each line of the $n-1$ lines of the tracking pattern. The output of AND circuit 186 is connected through OR circuit 206 to AND circuit 146. Thus, a dot pulse from lead 35 is gated onto lead 56 upon the occurrence of the first count of each of the $n-1$ lines of the tracking pattern. Thus, a sequence of dots which form the vertical left side of the tracking pattern are applied through video mixer 30 to the cathode ray tube.

In similar fashion, AND circuit 188 is gated by the $n-1$ count for each of the lines of the tracking pattern. Thus, through OR circuit 206 and AND circuit 146, a dot clock signal pulse will appear on the display at the end of every line of the tracking pattern thereby forming the right vertical side of the tracking pattern. AND circuit 178 is connected to the output of the *n*—1 position of the pattern line counter 160. AND circuit 178 operates similar to AND circuit 176 except that AND circuit 178 is enabled for the duration of the $n-1$ line of the tracking pattern. The output of AND circuit 178 is connected through OR circuit 206 to enable AND circuit 146 and allow dot clock signal pulses on lead 35 to appear on lead 56 for the duration of the bottom line of the tracking pattern thereby providing the bottom horizontal line of the tracking pattern.

As previously mentioned, when the A signal is present on lead 46, all four AND circuits 176, 178, 186 and 188 will be enabled and therefore all four sides of the tracking pattern will be generated. When the B signal is present on lead 48, output signals appear only on leads 198 and 200 and therefore only AND circuits 176 and 178 are enabled. Thus, only the top and bottom sides of the tracking pattern will be generated. When the C signal is present on lead 50, there will be an output only from lead 200 and therefore only the right vertical side of the tracking pattern will be generated and when the D signal on lead 52 is present only AND circuit 186 will be enabled and only the left vertical side of the tracking pattern will be generated. The set output leads from line latch circuit 148 and dot latch circuit 150 are also connected to an AND circuit 210. This produces an output signal on lead 54 which is the pattern aperture signal which is applied to AND circuit 64 of FIG. 2.

What has been described as a system for producing a tracking pattern for a light pen system which provides an indication of the direction of light pen movement in three deductive steps. The tracking pattern is also continually re-displayed at the instantaneous current position of the light pen as the pen moves across the screen of the cathode ray tube. The system was described with reference to a square tracking pattern and where in the second deductive step, the top and bottom sides of the square are displayed and in the third deductive step either the right side or the top side of the pattern is displayed. It will be appreciated by one skilled in the art that this invention is not limited to a partcular tracking pattern geometry or to the sequence of line displays illustrated in the embodment. For example, a square tracking pattern could be employed wherein the second step the left and right sides are displayed and wherein the third step either the left or bottom side is displayed. If desired, following the principles of the present invention, a rectangular tracking pattern or a tracking pattern having more than four sides may be employed with some modification to the system circuit.

It would also be possible to employ a tracking pattern which has one or more open sides. As different tracking patterns are employed the number of deductive steps, that is, the number of separate sub-combinations of sides of the pattern displayed will vary and thus the present invention is not limited to a three step display sequence as described for the present embodiment.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. In a light pen system including a cathode ray tube and a light pen having a photosensor for detecting illuminated points on the screen of said cathode ray tube as said light pen moves relative to said screen, the improvement comprising:

a cathode ray tube including a cathode ray deflection system for producing a rectilinear raster scan on the display screen of said tube, pattern generating means connected to said deflection system of said cathode ray tube for generating a first illuminated display of a pattern of M lines on said cathode ray tube screen, said light pen being directed to a region on said screen proximate to said lines, and said pattern generating means further including means for thereafter sequentially generating a plurality of display patterns consisting of different sub-groups of said M lines in response to said light pen's moving and detecting ones of said M lines and in the absence of said light pen's detecting ones of said M lines, said sub-groups of said M lines consisting of less than M lines.

2. A light pen system according to claim 1 including logic circuit means connected to said display pattern generating means for providing a signal indicating the direction of movement of said light pen.

3. A light pen system according to claim 2 including pattern position update means connected to said cathode ray tube deflection means and to said logic circuit means and responsive to said signal indicating the direction of movement of said light pen to actuate said deflection means to repeat said first displayed pattern and said plurality of display patterns in sequence at a different location on the screen of said cathode ray tube in the same direction as said light pen.

4. In a light pen system including a cathode ray tube and a light pen having a photosensor for detecting illuminated points on the screen of said cathode ray tube as said light pen moves relative to said screen, the improvement comprising:

a cathode ray tube including a cathode ray deflection system for producing a rectilinear raster scan on the display screen of said tube, pattern generating means connected to said deflection system of said cathode ray tube for generating a first illuminated display of a pattern on said cathode ray tube screen, said light pen being directed to the region proximate to pattern, and said pattern generating means further including means for thereafter generating a second illuminated display of a pattern consisting of a selected portion of said first pattern in response to said light pen's moving and detecting any portion of said first displayed pattern.

5. A light pen system according to claim 4 wherein said pattern generating means includes means for generating a third illuminated display after said second display consisting of a portion of said second displayed pattern in response to said light pen's detecting any portion of said second displayed pattern and consisting of a portion of said first displayed pattern which did not appear in said second display in the absence of any portion of said second displayed pattern being detected by said light pen.

6. A light pen system according to claim 5 further including logic circuit means connected to said display pattern generating means for providing a signal indicating the direction of movement of said light pen.

7. A light pen system according to claim 6 including pattern position update means connected to said cathode ray tube deflection means and to said logic means and responsive to said signal indicating the direction of movement of said light pen to actuate said deflection means to repeat said first, second and third pattern displays in sequence at a different location on the screen of the cathode ray tube in the same direction as said light pen.

8. In a light pen system including a cathode ray tube and a light pen having a photosensor for detecting illuminated points on the screen of said cathode ray tube as said light pen moves relative to said screen, the improvement comprising:

a cathode ray tube including a cathode ray tube deflection system for producing a rectilinear raster scan on the display screen of said tube, pattern generating means connected to said deflection system of said cathode ray tube for generating a first illuminated display of a closed pattern consisting of M lines on said cathode ray tube screen, said light pen being directed to the region enclosed by said M lines, and said pattern generating means further including means for thereafter generating a second illuminated display of a pattern consisting of selected N lines of said first displayed pattern where N is less than M in response to said light pen's moving and detecting any of said M lines of said first displayed pattern.

9. A light pen system according to claim 8 wherein said pattern generating means includes means for generating a third illuminated display after said second display consisting of a single line of said first displayed pat tern which also appeared in said second displayed pattern in response to said light pen's detecting any of said N lines of said second displayed pattern and consisting of a single line of said first displayed pattern which did not appear in said second displayed pattern in the absence of any of said N lines of said second displayed pattern being detected by said light pen.

10. A light pen system according to claim 9 further including logic circuit means connected to said display pattern generating means for providing a signal indicating the direction of movement of said light pen.

11. A light pen system according to claim 10 including pattern position update means connected to said cathode ray tube deflection means and said logic circuit means and responsive to said signal indicating the direction of movement of said light pen to actuate said deflection means to repeat said first, second and third pattern displays in sequence at a different location on the screen of the cathode ray tube in the same direction as said light pen.

12. In a light pen system including a cathode ray tube and a light pen having a photosensor for detecting illuminated points on the screen of said cathode ray tube as said light pen moves relative to said screen, the improvement comprising:

a cathode ray tube including a cathode ray deflection system for producing a rectilinear raster scan on the display screen of said tube, pattern generating means connected to said deflection system of said cathode ray tube for generating a first illuminated display of a closed pattern consisting of four lines on said cathode ray tube screen, said light pen being directed to the region enclosed by said four lines;

said pattern generating means further including means for thereafter generating a second illuminated display of a pattern consisting of two of said four lines of said first displayed pattern in response to said light pen's moving and detecting any of the four lines of said first displayed pattern;

and said pattern generating means including means for generating a third illuminated display after said second displayed pattern consisting of a first line of said second displayed pattern in response to said light pen detecting any of said two lines of said second displayed pattern and consisting of a second line of said first displayed pattern which was not displayed in said second displayed pattern in the absence of any of said two lines of said second display being detected by said light pen.

13. A light pen system according to claim 12 further including logic circuit means connected to said display pattern generating means for providing a signal indicating the direction of said light pen movement.

14. A light pen system according to claim 13 wherein said logic circuit means connected to said display pattern generating means includes means for producing a first output signal when said light pen detects said first line of said third displayed pattern, a second output signal in the absence of said first line of said third displayed pattern being detected by said light pen when said first line is being displayed, a third output signal when said light pen detects said second line of said third displayed pattern and a fourth output signal in the absence of said second line of said third displayed pattern being detected by said light pen when said second line is being displayed, each of said first, second, third and fourth signals being indicative that said light pen moved relative to said cathode ray tube screen in a separate one of the four directions up, down, right and left.

15. A light pen system according to claim 14 wherein said first displayed pattern is a square, said second displayed pattern consists of the top and bottom sides of said square, and said third displayed pattern consisting of the top side of said square when said light pen detects one of the top and bottom sides of said square and consisting of the right side of said square in the absence of one of said top and bottom sides of said second displayed pattern being detected by said light pen;

and including signal generating means connected to said light pen and said deflection means of said cathode ray tube for producing a first output signal when said light pen detects said top side of said third displayed pattern, a second signal in the absence of said top line of said third displayed pattern being detected by said light pen when said top side is being displayed, a third signal when said light pen detects said right side of said third displayed pattern and a fourth signal in the absence of said light pen detecting said right side of said third displayed pattern when said right side is being displayed, said first, second, third and fourth signals indicating that said light pen moved up, down, right and left respectively relative to said cathode ray tube screen.

16. A light pen system according to claim 13 further including pattern position update means connected to said cathode ray tube deflection means and said logic circuit means and responsive to said signal indicating the direction of said light pen movement to actuate said deflection means to repeat said first, second and third pattern displays in sequence at a different location on the screen of said cathode ray tube in the same direction as said light pen.

References Cited

UNITED STATES PATENTS

| | | | |
|---|---|---|---|
| 3,337,860 | 8/1967 | O'Hara, Jr. | 340—172.5 |
| 3,394,366 | 7/1968 | Dye | 340—172.5 |
| 3,413,515 | 11/1968 | Haring | 340—172.5 |

PAUL J. HENON, Primary Examiner

M. E. NUSBAUM, Assistant Examiner

U.S. Cl. X.R.

340—324.1